(12) United States Patent
Hintennach

(10) Patent No.: US 10,106,016 B2
(45) Date of Patent: Oct. 23, 2018

(54) ROLLER BLIND SHEET FOR A PROTECTIVE DEVICE OF A VEHICLE INTERIOR COMPARTMENT

(71) Applicant: BOS GMBH & CO. KG, Ostfildern (DE)

(72) Inventor: Markus Hintennach, Baltmannsweiler (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 15/526,210

(22) PCT Filed: Sep. 22, 2015

(86) PCT No.: PCT/EP2015/071763
§ 371 (c)(1),
(2) Date: May 11, 2017

(87) PCT Pub. No.: WO2016/074840
PCT Pub. Date: May 19, 2016

(65) Prior Publication Data
US 2018/0117995 A1     May 3, 2018

(30) Foreign Application Priority Data
Nov. 12, 2014   (DE) .......................... 10 2014 223 022

(51) Int. Cl.
*B60J 1/20*   (2006.01)
*B60J 3/00*   (2006.01)
(Continued)

(52) U.S. Cl.
CPC ........... *B60J 1/2041* (2013.01); *B60J 7/0015* (2013.01)

(58) Field of Classification Search
CPC ...... B60J 1/2013; B60J 1/2041; B60J 1/2052; B60J 7/0015; E06B 9/58; E06B 9/581; E06B 9/56; E06B 9/08
(Continued)

(56) References Cited

U.S. PATENT DOCUMENTS 4,825,921 A * 5/1989 Rigter ..................... E06B 9/54
                                                             160/23.1
5,131,450 A * 7/1992 Lichy ..................... B60J 1/2013
                                                           160/273.1
(Continued)

FOREIGN PATENT DOCUMENTS

DE            39 25 801 C2      2/1991
DE     10 2004 005 754 A1      8/2005
(Continued)

OTHER PUBLICATIONS

International Search Report issued in Application No. PCT/EP2015/071763 with English translation dated Dec. 15, 2015 (6 pages).
(Continued)

*Primary Examiner* — Katherine W Mitchell
*Assistant Examiner* — Jeremy C Ramsey
(74) *Attorney, Agent, or Firm* — Flynn Thiel, P.C.

(57) ABSTRACT

Roller blind sheet for a protective device of a vehicle interior compartment, including a flexible structure which is displaceable between a pulled-out protective position and compactly stored rest position in a vehicle interior. The structure is associated with lateral reinforcing metal tapes on opposite longitudinal sides thereof, and in the assembled state the tapes are guided in vehicle-related, lengthwise shiftable guiding rails. On the longitudinal sides of the structure, thin connecting strands made of metal are fixed, which are
(Continued)

welded to the respective metal tape using a plurality of welding spots spaced along the longitudinal direction of the longitudinal sides.

7 Claims, 2 Drawing Sheets

(51) Int. Cl.
    *B60J 11/00*     (2006.01)
    *B60J 7/00*     (2006.01)

(58) Field of Classification Search
    USPC .............................................. 160/266–273.1
    See application file for complete search history.

(56) References Cited

U.S. PATENT DOCUMENTS

| | | |
|---|---|---|
| 8,955,575 B2 | 2/2015 | Glasl et al. |
| 2008/0179910 A1 | 7/2008 | Fourel |
| 2008/0216971 A1* | 9/2008 | Rockelmann .......... B60J 1/2041 160/271 |
| 2009/0145559 A1* | 6/2009 | Glasl ...................... B60J 1/2041 160/273.1 |
| 2010/0005642 A1* | 1/2010 | Coenraets ................. E06B 9/13 29/428 |
| 2012/0291970 A1* | 11/2012 | Shiota .................... B60J 1/2052 160/370.22 |
| 2013/0186578 A1* | 7/2013 | Lin ........................... E06B 9/42 160/271 |
| 2014/0224436 A1* | 8/2014 | Yukisada ............... B60J 7/0015 160/267.1 |
| 2016/0023540 A1* | 1/2016 | Holzel ................... B60J 1/2027 160/266 |

FOREIGN PATENT DOCUMENTS

| | | |
|---|---|---|
| DE | 10 2005 024 657 A1 | 6/2006 |
| EP | 1 882 604 A1 | 1/2008 |
| WO | WO 2006/053520 A2 | 5/2006 |
| WO | WO 2013/149917 A1 | 10/2013 |

OTHER PUBLICATIONS

Written Opinion of International Searching Authority issued in Application No. PCT/EP2015/071763 dated Dec. 15, 2015 (5 pages).

Search Report of German Patent Office issued in Application No. 10 2014 223 022.5 dated Jul. 30, 2015 (4 pages).

* cited by examiner

ROLLER BLIND SHEET FOR A PROTECTIVE DEVICE OF A VEHICLE INTERIOR COMPARTMENT

The invention relates to a roller blind sheet for a protective device of a vehicle interior compartment, comprising a flexible structure which is displaceable between a pulled-out protective position and a compactly stored rest position in a vehicle interior, wherein the structure is associated with lateral reinforcing tapes on opposite longitudinal sides thereof, and in the assembled state said tapes are guided in vehicle-related guiding rails to be lengthwise shiftable, wherein the reinforcing tapes are embodied as metal tapes.

Such a roller blind sheet for a shading device of a transparent glass roof zone of a passenger vehicle is generally known. The roller blind sheet is designed as a flexible, textile fabric which is held on a winding shaft for winding on and off. On each of opposite longitudinal sides the fabric has a lateral selvedge, into which a reinforcing tape in the form of a metal tape is sewn in. For that purpose, the respective selvedge of the fabric is folded about the reinforcing tape so that the reinforcing tape embodied as a metal tape is held in a pocket formed by the selvedge of the fabric. The longitudinal sides of the fabric are guided in vehicle-related guiding rails on the sides of the glass roof zone to be lengthwise shiftable. For that purpose, the reinforcing tapes are inserted into the guiding rails and retained in a form-fitting manner within the guiding rails transversely to the pull-out direction of the fabric. The lateral guiding of the fabric ensures that the fabric is held spread out transversely to the pull-out direction and, consequently, is not sagging towards the center.

An object of the invention is to provide a roller blind sheet of the above mentioned type, which is capable of maintaining a robust and long-lasting transverse spreading function in a protective position within a vehicle interior compartment.

The object is achieved in that on the longitudinal sides of the structure thin connecting strands made of metal are fixed, which are welded to the respective metal tape using a plurality of welding spots spaced along the longitudinal direction of the longitudinal sides. Thereby, a particularly robust connection between the longitudinal sides of the structure and the reinforcing tapes designed as metal tapes is created. The solution according to the invention is adapted to protective devices in a vehicle interior, provided for shading of glass pane areas, like in particular glass roof zones, side or rear windows, or for horizontal luggage compartment covering or for approximately vertical partitioning of a luggage compartment within the vehicle interior.

According to the invention, a metal string or metal wire or a thin and narrow metal strip or a similarly designed thin metal profile is provided as the thin connecting strand made of metal. Preferably, on each of the longitudinal sides, there is merely one single connecting strand provided. It is also possible, to fix two or more thin connecting strands on each of the longitudinal sides. Advantageously, welding is by means of corresponding welding spots using a laser welding method, which allows particularly exact positioning of welding spots by means of corresponding laser control.

In an embodiment of the invention, each metal tape is associated with a respective connecting strand, wherein the metal tape and the connecting strand are arranged on opposite surface sides of the structure and connected to each other across and through a material thickness of the structure. Thus, the metal tape and the connecting strand are provided on the upper and lower sides in the region of each longitudinal side of the structure, and welded to each other across and through the structure by means of corresponding welding spots.

In a further embodiment of the invention, each connecting strand is designed as a metal string which is connected to the structure using textile weaves and laid out along the longitudinal side of the structure, in particular in a zig-zag line. The zig-zag line can be laid out in the type of a sinus curve by alternated guiding of the metal string in an angled or a round pattern. What is meant by "textile weaves" are connections between the metal string and the structure by sewing using additional filamentous material or even by embedding the metal string during the textile production of the structure, in particular by incorporating the metal string in a corresponding woven or knitted fabric, which is the structure.

In a further embodiment of the invention, at least one row of holes extending in the longitudinal direction is provided in the structure, which holes are traversed by the metal string and the metal string is connected to the metal tape by corresponding welding spots through and across said holes. The holes provided prevent a risk of thermal damage to the structure due to the fixing of the welding spots.

In a further embodiment of the invention, the metal string and the metal tape are made of steel. As a result, on the one hand, a particularly good material-bonding engagement between metal string and metal tape is obtainable. On the other hand, steel has a particularly high strength so that the roller blind sheet can undergo a constant transverse spreading function over a long period.

In a further embodiment of the invention, the structure is a textile fabric in the form of a woven or knitted fabric, or in the form of a single-layer or multi-layer film sheet. In case the structure is a multi-layer film sheet, corresponding individual film layers are interconnected across the entire surface area of the structure by laminating.

In a further embodiment of the invention, the metal string is incorporated into the woven or knitted fabric by textile techniques. Incorporation of the metal string can be as early as during the mechanical manufacturing of the woven or knitted fabric, or the metal string is subsequently pulled or pushed into the woven or knitted fabric which is the structure.

The invention also relates to a protective device for a vehicle interior compartment, comprising a roller blind sheet configured according to the explanations above.

Further advantages and features of the invention will become apparent from the claims and the description given below of a preferred exemplary embodiment of the invention illustrated with reference to the drawings.

Figure 1:
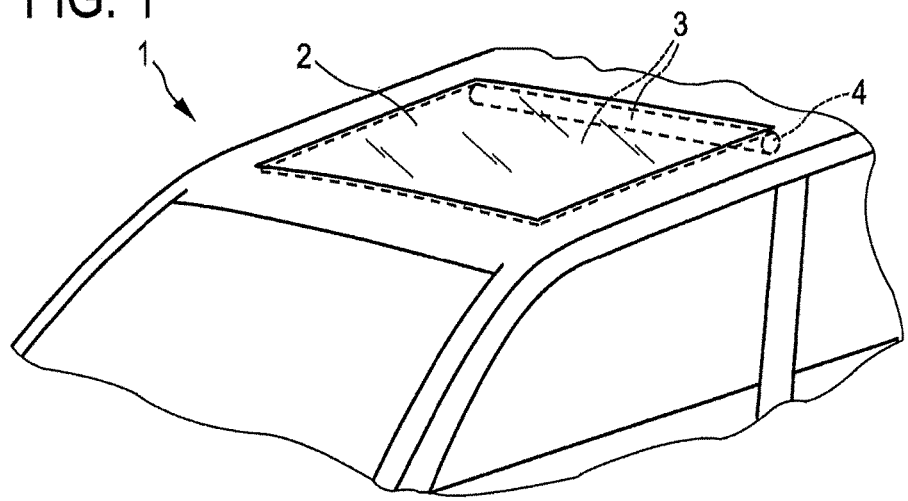
FIG. 1 shows schematically an embodiment of a roller blind sheet according to the invention for a shading device of a glass roof zone of a passenger vehicle.
Figure 2:
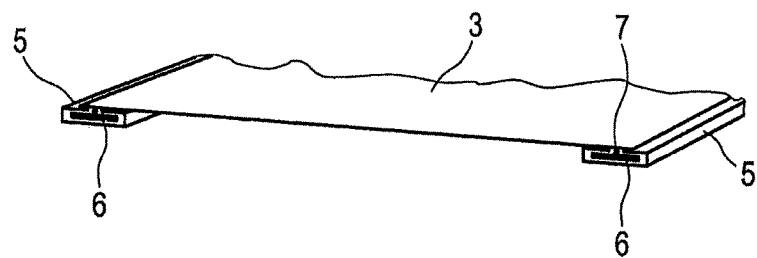
FIG. 2 shows schematically a section of the shading device provided with the roller blind sheet according to FIG. 1.

A passenger vehicle 1 according to FIG. 1 includes a vehicle roof provided with a roof opening portion. The roof opening portion can be closed or exposed by a movable glass roof 2. The glass roof 2 is associated with a shading device on an inner side facing the vehicle interior, in order to allow shading of the vehicle interior from solar radiation penetrating the glass roof 2. The shading device includes a roller blind sheet comprising a flexible structure 3, in the present case in the form of a multi-layered film sheet. The structure 3 is mounted on a winding shaft 4 for winding on and off, which shaft is arranged in a manner fixed to the vehicle and rotatably mounted within the vehicle interior directly behind the glass roof 2. The structure 3 has, on its face end region that is in front in the pull-out direction, a dimensionally stable pull-out profile (not illustrated in more detail) which is held in vehicle-fixed guiding rails for longitudinal shifting.

Figure 3:
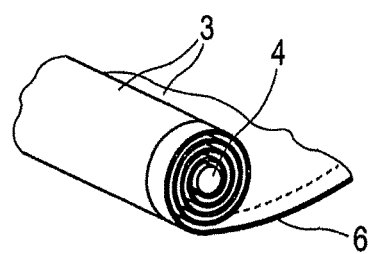
FIG. 3 shows schematically the roller blind sheet according to FIG. 1 in a condition partially wound-up on a winding shaft.

The structure 3 is provided with a respective reinforcing tape 6 on each of the opposite longitudinal sides thereof, which tape presents sufficient flexibility, in order to be wound onto or wound off the winding shaft 4 together with the structure 3 (FIG. 3). Each reinforcing tape 6 is embodied as a metal tape and guided to be lengthwise shiftable in a respective vehicle-fixed guiding rail 5 disposed within the vehicle interior below a respective side edge of the glass roof 2. Each reinforcing tape 6 is firmly connected to the respective longitudinal side of the structure 3 over the entire length of the structure 3 so that the two reinforcing tapes 6 together with the structure 3 can be pulled off the winding shaft 4 or wound onto said shaft.

Figure 4:
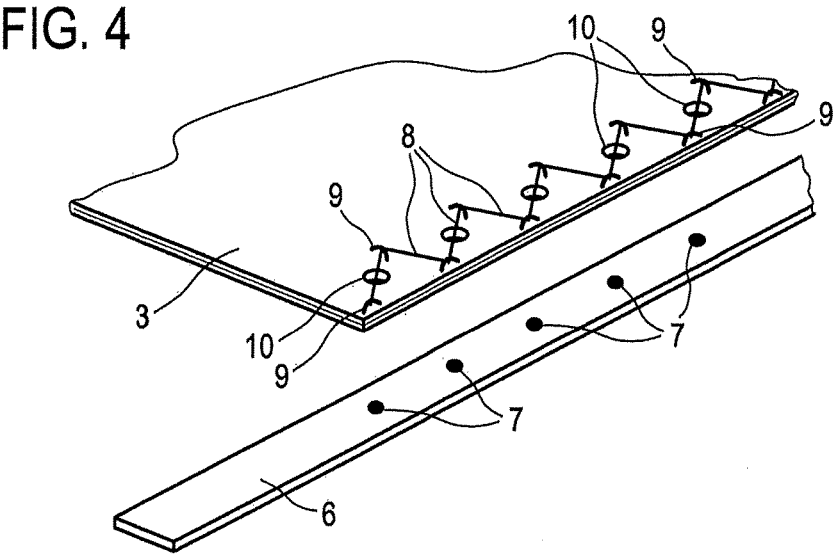
FIG. 4 shows schematically an explosion view of a longitudinal side region of the roller blind sheet according to FIGS. 1 to 3.
Figure 5:
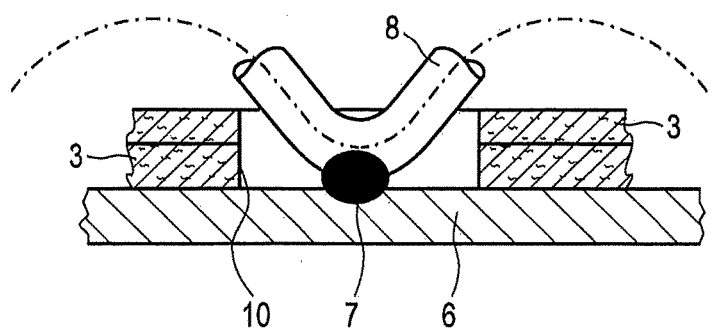
FIG. 5 shows in an enlarged schematic cross-sectional view a section of the roller blind sheet according to FIGS. 1 to 4 in the region of a welding of an upper-sided metal strip to a lower-sided metal tape.

The two reinforcing tapes 6 are connected to the opposite longitudinal sides of the structure 3 by a plurality of welding spots 7 extending uniformly over the length of the respective reinforcing tape 6. For that purpose, the structure 3 includes, on a surface side opposite the reinforcing tape 6, a connecting strand 8 in the form of a metal string which is guided in a zig-zag pattern along the longitudinal side of the structure 3 and sewn to the structure 3 via loop-shaped stitching points 9. A respective row of holes 10 is provided in the structure 3 in the region of each longitudinal side, which holes are disposed in the longitudinal direction of the structure 3, mutually spaced at uniform intervals and penetrate a material thickness of the structure 3 completely (FIGS. 4 and 5). The zig-zag pattern of the connecting strand 8 embodied as a metal string in the region of each of the two longitudinal sides of the structure 3 is selected such that the connecting strand 8 traverses each hole 10 on the surface side of the structure 3 located opposite to the reinforcing tape 6. The connecting strand 8 is embodied as a steel string or as a steel wire and is welded in the region of each hole 10 to the reinforcing tape 6, likewise made of steel, using the already described welding spots 7. The welding spots 7 are set coaxially to the holes 10 of the structure 3 in high precision using laser welding. The energy input due to the laser welding is so exact and spatially limited that the edges of each of the holes 10 is not or not significantly subject to thermal stresses due to the welding procedure so that there is no damage to the structure 3 occurring as a result of the welding. In the exemplary embodiment as illustrated, the connecting strand 8 in the form of the metal string is provided in the region of the upper side of the structure 3, whereas the reinforcing tape 6 is positioned complementary and opposite on the lower side of the structure 3. In an alternative embodiment of the invention, the reinforcing tape 6 is positioned in the region of the upper side and the connecting strand in the form of the metal string sewn to the structure 3 in the region of the lower side of the structure. Welding is performed in an analogous manner through and across the holes 10.

The invention claimed is:

1. Roller blind sheet for a protective device of a vehicle interior compartment, comprising a flexible structure which is displaceable between a pulled-out protective position and a compactly stored rest position in a vehicle interior, wherein the structure is associated with lateral reinforcing tapes on opposite longitudinal sides thereof, and in an assembled state said reinforcing tapes are each guided in a respective guiding rail to be lengthwise shiftable, wherein the reinforcing tapes are metal tapes, wherein on each longitudinal side of the structure a respective connecting strand made of metal is fixed, which is welded to the respective reinforcing tape using a plurality of welding spots spaced along a longitudinal direction of the longitudinal sides.

2. Roller blind sheet according to claim 1, wherein each reinforcing tape is associated with the respective connecting strand, wherein the reinforcing tape and the connecting strand are arranged on opposite surface sides of the structure and connected to each other across and through a material thickness of the structure.

3. Roller blind sheet according to claim 1, wherein each connecting strand is designed as a metal string which is connected to the structure by textile weaves and laid out along the respective longitudinal side of the structure.

4. Roller blind sheet according to claim 1, wherein at least one row of holes extending in the longitudinal direction is provided in the structure, which holes are traversed by one of the respective connecting strands and the respective connecting strand is connected to a respective one of the reinforcing tapes by corresponding welding spots through and across said holes.

5. Roller blind sheet according to claim 4, wherein the connecting strands and the reinforcing tapes are made of steel.

6. Roller blind sheet according to claim 1, wherein the structure is a textile fabric in the form of a woven or knitted fabric, or in the form of a single-layer or multi-layer film sheet.

7. Roller blind sheet according to claim 6, wherein the connecting strands are incorporated into the woven or knitted fabric by textile techniques.

\* \* \* \* \*